# United States Patent [19]

Glueck et al.

[11] Patent Number: 6,130,265
[45] Date of Patent: Oct. 10, 2000

[54] METHOD FOR PRODUCING EXPANDABLE STYRENE POLYMERS CONTAINING GRAPHITE PARTICLES

[75] Inventors: Guiscard Glueck, Mainz; Klaus Hahn, Kirchheim; Karl-Heinz Batscheider, Mutterstadt; Dieter Naegele, Worms; Knut Kaempfer, Ludwigshafen; Wolfram Husemann, Neustadt; Frieder Hohwiller, Bad Duerkheim, all of Germany

[73] Assignee: BASF Aktiengesellschaft, Ludwigshafen, Germany

[21] Appl. No.: 09/423,614

[22] PCT Filed: May 14, 1997

[86] PCT No.: PCT/EP97/02457

§ 371 Date: Nov. 15, 1999

§ 102(e) Date: Nov. 15, 1999

[87] PCT Pub. No.: WO98/51734

PCT Pub. Date: Nov. 19, 1998

[51] Int. Cl.[7] .................................................. C08J 9/18
[52] U.S. Cl. ................. 521/56; 521/57; 521/82; 521/146
[58] Field of Search ................. 521/56, 57, 82, 521/146

[56] References Cited

U.S. PATENT DOCUMENTS 3,117,943  1/1964  Corbiere et al. .

5,783,612  7/1998  Batscheider et al. ............... 521/56
5,908,872  6/1999  Glück et al. ........................ 521/96

FOREIGN PATENT DOCUMENTS 0 620 246      4/1994   European Pat. Off. .
296 16 361 U  11/1996   Germany .
296 16 362 U  11/1996   Germany .
1 588 314      4/1981   United Kingdom .

OTHER PUBLICATIONS

Chemical Abstract, vol. 106, No. 8, Feb. 23, 1987, Mishima, Seizo et al, "Carbon black–containing polystyrene beads".

Chemical Abstracts, vol. 105, No. 26, Dec. 29, 1986, Bryk, M. T. et al: "Structure and properties of polystyrene prepared by polymerization in the presence of carbon fillers" & Polym., Compos., Proc., Microsymp. Macromol., 28th (1986).

Chemical Abstracts, vol. 110, No. 22, May 29, 1989, Bryk, M. T. et al: "Polystyrene synthesis in the presence of dispersed carbon fillers".

*Primary Examiner*—Morton Foelak
*Attorney, Agent, or Firm*—Oblon, Spivak, McClelland, Maier & Neustadt, P.C.

[57] ABSTRACT

In a process for preparing expandable styrene polymers containing graphite particles, styrene is polymerized in aqueous suspension in the presence of graphite particles.

9 Claims, No Drawings

METHOD FOR PRODUCING EXPANDABLE STYRENE POLYMERS CONTAINING GRAPHITE PARTICLES

The invention relates to a process for preparing particulate, expandable styrene polymers containing graphite particles.

Expanded polystyrene foams have been known for a long time and have proven themselves in many areas. Such foams are produced by foaming polystyrene particles impregnated with blowing agents and subsequently welding the resulting foam particles together to form moldings. An important field of application is thermal insulation in building and construction.

The expanded polystyrene foam boards used for thermal insulation usually have densities of about 30 g/l since the thermal conductivity of the expanded polystyrene foam has a minimum at these densities. To save material and space, it would be desirable to use foam boards having lower densities, in particular <15 g/l, for thermal insulation. The production of such foams is technically not a problem. However, foam boards having such a low density have a drastically reduced thermal insulation capability so that they do not meet the requirements of the thermal conductivity class 035 (DIN 18 164, Part 1).

It is known that the thermal conductivity of foams can be reduced by incorporation of athermanous materials such as carbon black, metal oxides, metal powder or pigments.

Thus, EP-A 372 343 describes polystyrene foams containing from 1 to 25% by weight of carbon black. The carbon black has a particle size of from 10 to 100 nm. The polystyrene foams described there are produced predominantly by the extrusion method and preferably have a density of 32–40 g/l. In addition, the production of particulate polystyrene containing blowing agent by mixing a carbon black concentrate in polystyrene together with blowing agents into a polystyrene melt and extruding and granulating the mixture is described. This is a rather complicated procedure.

WO 94/13721 describes similar foams in which the size of the carbon black particles is>150 nm.

EP-A 620 246 describes expanded polystyrene foam moldings containing a particulate athermanous material, in particular carbon black but also graphite. The density of the moldings is below 20 g/l. The incorporation of the particles into the moldings is preferably carried out by coating the surface of the prefoamed polystyrene beads or by embedding into the not yet foamed polystyrene granules. However, this distribution of the particles on the surface of the polystyrene particles greatly impairs the welding of the prefoamed beads and consequently leads to low-quality foams; in addition, the particles can be rubbed off the surface of the moldings. In both cases, the particles are not homogeneously distributed in the interior of the polystyrene particles.

It is an object of the present invention to provide a simple process for preparing expandable styrene polymers containing graphite which can be processed to form expanded polystyrene foams having a low density and a particularly low thermal conductivity and have good processing properties and good physical properties.

We have found that this object is achieved by suspension polymerization of styrene in the presence of graphite.

The present invention provides a process for preparing expandable styrene polymers containing graphite particles, which comprises polymerizing styrene, if desired together with 20% of its weight of comonomers, in aqueous suspension in the presence of graphite particles and adding a blowing agent before, during or after the polymerization.

The invention further provides expandable styrene polymers which contain from 0.05 to 25% by weight of homogeneously distributed graphite particles and are in the form of round beads having a mean diameter in the range from 0.2 to 2 mm.

In WO 95/10558, it is recommended that the compatibility of carbon black with polystyrene be improved by coating the carbon black with plasticizers. A number of methods of producing such foams are indicated, including the polymerization of styrene in the presence of coated thermal black, addition of blowing agents and cooling the resulting expandable particles. However, such a bulk polymerization of styrene cannot be carried out to a conversion of 100%, so that the expandable particles still contain residual monomers. Surprisingly, the suspension polymerization of styrene in the presence of graphite in contrast proceeds without problems and to completion.

For the purposes of the present invention, expandable styrene polymers are styrene polymers containing blowing agent.

The expandable styrene polymers of the present invention comprise as polymer matrix, in particular, homopolystyrene or styrene copolymers containing up to 20% by weight, based on the weight of the polymers, of ethylenically unsaturated comonomers, in particular alkyl styrenes, divinyl benzene, acrylonitrile or α-methyl styrene.

In the suspension polymerization of the present invention, the customary auxiliaries such as peroxide initiators, suspension stabilizers, blowing agents, chain transferers, expanding aids, nucleating agents and plasticizers can be added. Particular preference is given to adding flame retardants, preferably in amounts of from 0.6 to 6% by weight, and flame retardant synergists in amounts of from 0.1 to 1% by weight, in each case based on the resulting styrene polymer. Preferred flame retardants are aliphatic, cycloaliphatic and aromatic bromine compounds such as hexabromocyclododecane, pentabromomonochlorocyclohexane and pentabromophenyl allyl ether. Suitable synergists are C—C— or O—O-labile organic compounds such as bicumyl and dicumyl peroxide. Blowing agents are added in amounts of from 3 to 10% by weight, based on styrene polymer. They can be added to the suspension before, during or after the polymerization. Suitable blowing agents are aliphatic hydrocarbons having from 4 to 6 carbon atoms. It is advantageous to use inorganic Pickering dispersants, e.g. magnesium pyrophosphate or calcium phosphate, as suspension stabilizers.

It has been found that it is favorable to the stability of the suspension if a solution of polystyrene (or a corresponding styrene copolymer) in styrene (or the mixture of styrene with comonomers) is present at the commencement of the suspension polmerization. Preference is given to starting from a 0.5–30% strength by weight, in particular 3–20% strength by weight, solution of polystyrene in styrene. This can be prepared by dissolving fresh polystyrene in monomers, but it is advantageously prepared using oversize and undersize fractions which are screened out from the beads obtained in the preparation of expandable polystyrene. In practice, such unusable oversize and undersize fractions have diameters of greater than 2.0 mm and less than 0.2 mm respectively. Recycled polystyrene and recycled polystyrene foam can also be used. Another possibility is to prepolymerize styrene in bulk to a conversion of from 0.5 to 70% and then to suspend the prepolymer together with the graphite particles in the aqueous phase and complete the polymerization.

The graphite used preferably has a mean particle size of 1–50 μm, in particular 2.5–12 μm, a bulk density of 100–500 g/l and a specific surface area of 5–20 m$^2$/g. It is possible to use natural graphite or milled synthetic graphite.

In the suspension polymerization of the present invention, the graphite particles are preferably added in amounts of from 0.05 to 25% by weight, in particular from 2 to 8% by weight, based on the resulting styrene polymer. They are used either in powder form or as a granular concentrate in polystyrene. It is also possible in principle to add the graphite particles only during the course of the suspension polymerization, preferably during the first half of the polymerization cycle. In this case, addition of polystyrene is superfluous. The suspension polymerization forms bead-shaped, essentially round particles having a mean diameter in the range from 0.2 to 2 mm in which the graphite particles are homogeneously distributed. They can be coated with the customary coating agents, e.g. metal stearates, glyceryl esters and finely divided silicates.

The expandable styrene polymers containing graphite particles can be processed to form polystyrene foams having densities of 5–35 g/l, preferably from 8 to 25 g/l and in particular 10–15 g/l.

For this purpose, the expandable particles are prefoamed. This is usually achieved by heating the particles with steam in prefoamers.

The particles which have been prefoamed in this way are then welded together to form moldings. For this purpose, the prefoamed particles are introduced into molds which do not close so as to be gastight and treated with steam. After cooling, the moldings can be taken out.

The foams produced from the expandable styrene polymers of the present invention display an excellent thermal insulation capability. This effect is particularly clear at low densities. Thus, addition of 2% by weight of graphite to an expandable styrene polymer enabled the thermal conductivity of a foam having a density of 10 g/l to be reduced from 44 mW/m·K to below 35 mW/m·K.

The ability to reduce the density of the styrene polymers significantly at the same thermal conductivity allows savings in material to be achieved. Since, compared to conventional expandable styrene polymers, the same degree of thermal insulation can be achieved at significantly lower bulk densities, thinner foam boards can be employed when the expandable polystyrene particles prepared according to the present invention are used, which makes it possible to save space.

Surprisingly, the expandable styrene polymers of the present invention can be processed to produce low-density foams without any problems. Neither blowing agent losses nor disturbance of the cell structure of the foams occur, although a person skilled in the art would have to assume that graphite would act as nucleating agent and lead to an undesirably fine-celled foam. In addition, self-extinguishing foams which pass the burning test B2 and in most cases even B1 can be produced by addition of flame retardants.

The invention is illustrated by the following examples. The parts and percentages specified are by weight.

EXAMPLE 1

2.55 kg of polystyrene (PS 158 K from BASF) are dissolved in 17.03 kg of styrene, and 196 g of pulverulent graphite (Graphitwerk Kropfmühle KG, UF2 96/97), i.e. 1% of graphite based on the total amount of styrene and polystyrene, are homogeneously suspended in the solution with addition of 59.6 g of dicumyl peroxide and 20.4 g of dibenzoyl peroxide. The organic phase is introduced into 19.5 l of deionized water in a 50 l stirred vessel. The aqueous phase contains 69.8 g of sodium pyrophosphate and 129.5 g of magnesium sulfate. 195.8 g of pentane are metered into the suspension, which is then heated to 80° C. After 140 minutes, 3.51 g of emulsifier K 30/40 (Bayer AG) are added. After a further 30 minutes, another 1175.1 g of pentane are metered in and polymerization is completed at 134° C. Separating off the aqueous phase gives homogeneously dark beads having a mean diameter of 0.82 mm. The beads can be foamed using steam to a bulk density of 11.8 g/l after 3 minutes. The thermal conductivity was measured at 10° C. in accordance with DIN 52 612, giving a value of 35 mW/m·K.

EXAMPLE 2

Example 1 was repeated using 2% of graphite. The thermal conductivity of the foam beads having a bulk density of 10 g/l was 34 mW/m·K.

EXAMPLE 3

Example 1 was repeated using 4% of graphite. The thermal conductivity at a bulk density of 12 g/l was 34 mW/m·K.

EXAMPLE 4 (Comparison)

Example 1 was repeated without addition of graphite. The thermal conductivity of the foam beads having a bulk density of 10 g/l was 44 mW/m·K.

EXAMPLE 5

Example 2 was repeated with addition of 127 g of hexabromocyclododecane and 85 g of bicumyl as flame retardant system. The polymerization was carried out at 125° C. A thermal conductivity of 34 mW/m·K and the requirements of the fire protection class B 2 were met.

EXAMPLE 6

In a stirred pressure vessel, a mixture of 150 parts of deionized water, 0.1 part of sodium pyrophosphate, 100 parts of styrene, 0.45 part of benzoyl peroxide, 0.15 part of tert-butyl perbenzoate and also 5 parts of Kropfmühl graphite powder UFT 99.5, two parts of hexabromocyclododecane (HBCD) and 0.4 part of dicumyl peroxide were heated to 90° C. while stirring.

After 2 hours at 90° C., 4 parts of a 10% strength aqueous solution of polyvinylpyrrolidone were added.

Stirring was continued for another 2 hours at 90° C. and 7 parts of a mixture of 80% of n-pentane and 20% of iso-pentane were added. The mixture was subsequently stirred for 2 hours at 110° C. and finally for 2 hours at 140° C.

The resulting expandable polystyrene beads were washed with deionized water, screened to 0.7–1.0 mm and subsequently dried in warm air.

The beads were prefoamed in flowing steam and, after storage for one day, were welded together by further treatment with steam in a closed mold to give foam blocks having a density of 15 g/l.

The thermal conductivity was measured at 10° C. in accordance with DIN 52612, giving a value of 34 mWm·K.

EXAMPLE 7

0.498 kg of oversize/undersize EPS is dissolved in 16.6 kg of styrene, and 16.6 g of pulverulent graphite (Graphitwerk Kropfmühl KG, UF2 96/97), i.e. 0.1% of graphite based on the total amount of styrene and EPS, are homogeneously suspended in the solution with addition of 83.0 g of dicumyl peroxide and 4.15 g of dibenzoyl peroxide plus 112.033 g of hexabromocyclododecane (HBCD). The organic phase is introduced into 19.3 l of deionized water in a 50 l stirred vessel. The aqueous phase contains 46.127 g of sodium pyrophosphate and 86.348 g of magnesium sulfate (Epsom salts). The suspension is heated to 80° C. over a period of 40 minutes. 2.32 g of emulsifier K 30/40 (Bayer AG) are then added. After a further 40 minutes, 1330 g of pentane are metered in and polymerization is completed at 126° C.

Separating off the aqueous phase gives homogeneously gray beads having a mean diameter of 1.18 mm. After prefoaming twice using steam, the beads have a bulk density of 10.0 g/l. The internal water content is <1.5% and the residual styrene content is <1000 ppm. The thermal conductivity at a bulk density of 10 g/l is 2 mW/m·K lower than that of a product without incorporated graphite.

COMPARATIVE EXAMPLE 8
Coating of the Surface With Graphite

In a mixer, prefoamed EPS beads were admixed with 2.0% of graphite. Coating was incomplete and the graphite was distributed nonuniformly over the bead surface. During further processing, a great deal of graphite was rubbed off the bead surface. The use of binders (glyceryl stearate, white oil) was able to achieve no improvement in the quality of the coating results. The welding of the moldings was unsatisfactory.

We claim:

1. A process for preparing expandable styrene polymers containing graphite particles, which comprises polymerizing styrene, optionally together with 20% of its weight of comonomers, in aqueous suspension in the presence of graphite particles having a mean particle size of from 1 to 50 μm with addition of peroxide initiators and adding a blowing agent before, during or after the polymerization.

2. A process as claimed in claim 1, wherein the polymerization is carried out in the presence of from 0.05 to 25% by weight of graphite, based on styrene polymer.

3. A process as claimed in claim 1, wherein the suspension polymerization is carried out in the presence of an organic bromine compound as flame retardant.

4. A process as claimed in claim 1, wherein a solution of polystyrene in styrene is used in the suspension polymerization.

5. A process as claimed in claim 4, wherein a 0.5 to 30% strength by weight, preferably 5–20% strength by weight, solution of polystyrene in styrene is used.

6. A process as claimed in claim 4, wherein the polystyrene used is oversize and/or undersize fractions of expandable polystyrene.

7. A process as claimed in claim 1, wherein styrene is prepolymerized to a conversion of from 0.5 to 70% and the prepolymer together with the graphite particles is transferred to the aqueous phase.

8. Particulate expandable styrene polymers containing from 0.05 to 25% by weight of graphite particle, wherein the graphite particles are homogeneously distributed in the styrene polymer and the styrene polymer is in the form of round beads having a mean diameter in the range from 0.2 to 2 mm.

9. A foam, comprising the particulate expandable styrene polymers as claimed in claim 8 and a density of from 5 to 35 g/l.

* * * * *